(12) United States Patent
Tanimoto

(10) Patent No.: US 7,697,510 B2
(45) Date of Patent: Apr. 13, 2010

(54) COMMUNICATION TERMINAL DEVICE AND REMOTE DIAGNOSTIC METHOD OF THE COMMUNICATION TERMINAL DEVICE

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 11/394,866

(22) Filed: Mar. 31, 2006

(65) Prior Publication Data

US 2007/0036276 A1 Feb. 15, 2007

(30) Foreign Application Priority Data

May 24, 2005 (JP) ............... 2005-151305

(51) Int. Cl.
*H04L 12/66* (2006.01)
(52) U.S. Cl. .................. 370/352; 379/387.01
(58) Field of Classification Search .......... 370/352; 379/441, 398, 387.01; 386/96; 713/2; 714/57
See application file for complete search history.

(56) References Cited

U.S. PATENT DOCUMENTS

| | | | | |
|---|---|---|---|---|
| 7,149,936 B2 * | 12/2006 | Deshpande et al. | ........... | 714/57 |
| 2002/0194214 A1 | 12/2002 | Fukazawa | | |
| 2004/0111599 A1 * | 6/2004 | Jordan et al. | ........... | 713/2 |
| 2004/0264938 A1 * | 12/2004 | Felder | ........... | 386/96 |
| 2005/0097405 A1 * | 5/2005 | Sesek et al. | ........... | 714/48 |

FOREIGN PATENT DOCUMENTS

| | | |
|---|---|---|
| JP | 2000-207141 | 7/2000 |
| JP | 2002205449 A | 7/2002 |
| JP | 2003076533 A | 3/2003 |

OTHER PUBLICATIONS

Japanese language office action and its English language translation for corresponding Japanese application 2005151305 lists the reference above.

* cited by examiner

*Primary Examiner*—William J Deane
(74) *Attorney, Agent, or Firm*—Hogan & Hartson LLP

(57) ABSTRACT

A communication terminal device converts a sound in the communication terminal device into an audio frequency signal, converts the converted audio frequency signal or an audio frequency signal transmitted in the communication terminal device into a digital audio signal, and transmits the digital audio signal to a center device via an IP network.

21 Claims, 5 Drawing Sheets

FIG. 4

RECORDING MANAGEMENT TABLE 7a

| TYPE OF RECORDING | RECORDING TIME |
|---|---|
| RECORDING OF SOUND OF FACSIMILE COMMUNICATION | FIVE COMMUNICATIONS FROM 8:00 |
| RECORDING BY MICROPHONE 14A | EVERY MONDAY FROM 22:00-0:00 |
| RECORDING BY MICROPHONE 14A | TEN TIMES AT PRINTING |

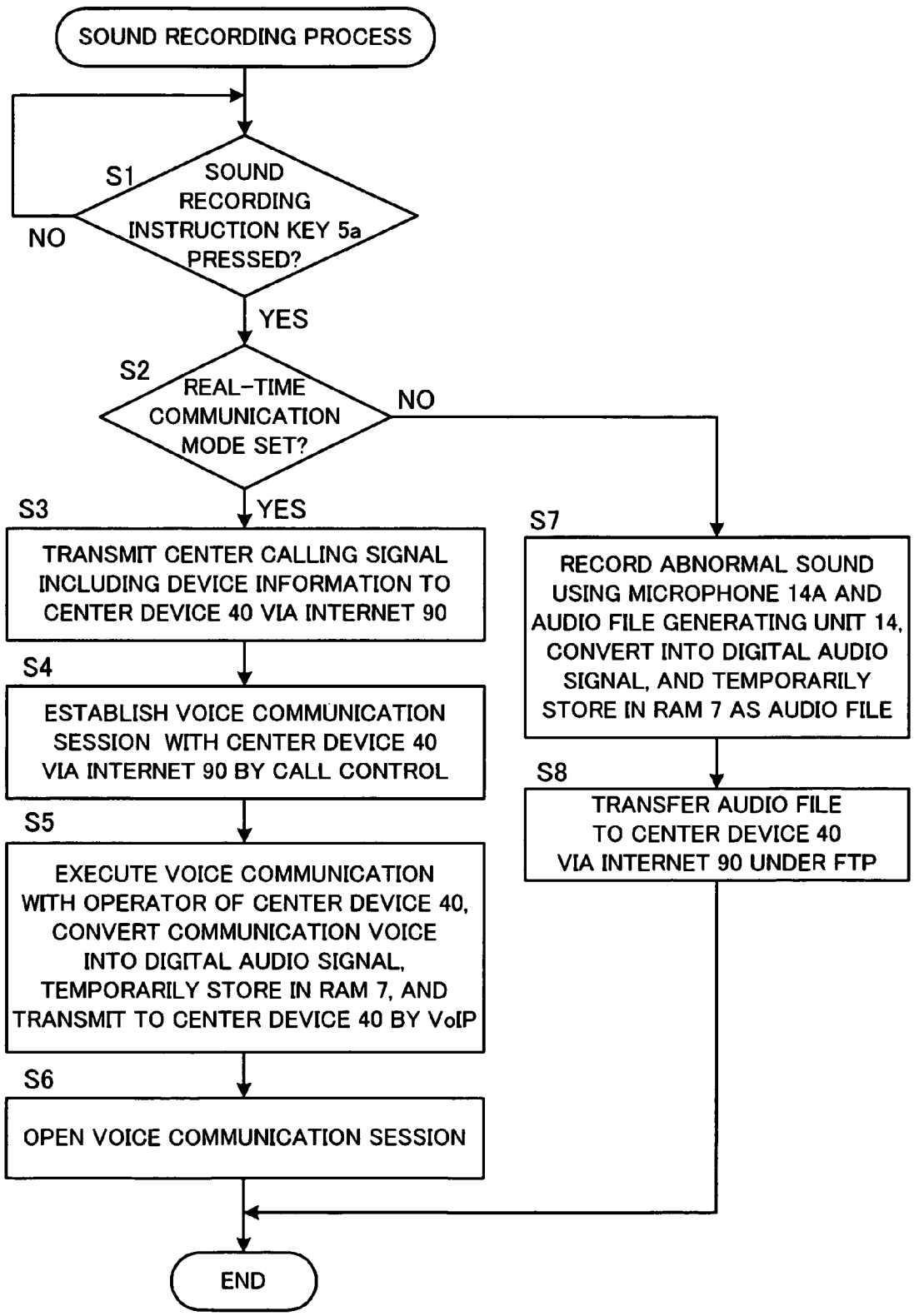

COMMUNICATION TERMINAL DEVICE AND REMOTE DIAGNOSTIC METHOD OF THE COMMUNICATION TERMINAL DEVICE

BACKGROUND OF THE INVENTION

1. Field of the Invention

The present invention relates to a communication terminal device, such as a digital Multi-Function Peripheral (MFP) and a facsimile machine, and a remote diagnostic method of the communication terminal device.

2. Description of the Related Art

A conventional remote maintenance system remotely monitors an operation status of various electronic equipment and devices installed in homes, offices, factories, etc., and carries out maintenance on a target device when an abnormality is generated. In such a remote maintenance system, a remote diagnosis is performed via a telephone line, and a remote service center controls reading of data stored in a terminal and writing of data in the terminal.

For example, in a known system, a diagnosis operation of an image forming device, designated to be monitored, is automated. Only when abnormality is found again, a serviceperson travels to a client and performs maintenance work. In such a known system, a communication line connects a plurality of copiers to a management device, which carries out a remote management of the copiers. In addition, a communication line connects the management device to a plurality of terminal devices respectively installed at a plurality of service locations. For each copier designated to be monitored, the management device periodically acquires time-series data for a predetermined period of time necessary for the diagnosis. The management device sequentially executes a diagnosis of a failure in a feeding system, a failure in an image processing system, a failure which causes an indication for a serviceperson call, a failure in an operation system, a failure of an abnormal sound, and a failure in an input and operation system. If no failure is found as a result of the diagnosis, the management device creates a report including diagnosis contents and a diagnosis result. When even one abnormality is found, as a result of the diagnosis, the management device transmits information requesting a visit of a serviceperson and information necessary for re-inspection to a terminal device at a service location managing a copier with the abnormality.

However, in the above-described conventional system, a serviceperson is ultimately required to travel to a target device and check the failure.

SUMMARY OF THE INVENTION

In order to overcome the problems described above, the present invention provides a communication terminal device, such as a facsimile machine and a digital MFP, which can grasp a status of a failure without a visit of a serviceperson.

According to a first aspect of the present invention, a communication terminal device is connected to a center device via an Internet Protocol (IP) network. The communication terminal device converts a sound that is generated in the communication terminal device or an audio frequency signal as a communication protocol transmitted in the communication terminal device into a digital audio signal in accordance with a prescribed operation. Then, the communication terminal device transmits the converted digital audio signal to the center device via the IP network.

According to a second aspect of the present invention, the communication terminal device stores a recording management table storing a time of the transmission process. At the predetermined time stored in the recording management table, the communication terminal device converts the sound, the audio frequency signal or a communication signal into a digital audio signal and transmits the converted digital audio signal to the center device.

According to a third aspect of the present invention, the communication terminal device transmits the digital audio signal to the center device by the Voice over Internet Protocol (VoIP) or streaming, which is a real-time communication mode. Alternatively, the communication terminal device transmits an audio file of the digital audio signal to the center device.

According to the conventional system, when an abnormal sound generates in a communication terminal device being used, a user inquires a service center as to a presence of a failure. However, it is extremely difficult for the user to appropriately convey information of the generating abnormal sound. Thus, a serviceperson had to listen to the abnormal sound on the spot. However, the abnormal sound or the like is generated from time to time. When the serviceperson arrives on the spot, the abnormal sound may not be generating and the serviceperson may fail to collect data.

According to the first aspect of the present invention, the communication terminal device converts a sound that is generated in the communication terminal device or a voice transmitted in the communication terminal device into a digital audio signal in accordance with a prescribed operation. Then, the communication terminal device transmits the converted digital audio signal to the center device via the IP network. Therefore, the sound, such as an abnormal sound that is generated in the communication terminal device or the audio frequency signal, such as a communication voice transmitted in the communication terminal device, can be listened to from the center device. This can be helpful in investigating a cause of the failure in the communication terminal device. That is, by a remote diagnostic function using an always-connected IP network, the communication terminal device itself can collect the abnormal sound that is generated due to the failure in the communication terminal device, and transmit the digital audio signal converted from the collected abnormal sound to the center device. Furthermore, the communication terminal device can transmit the audio signal transmitted in the communication terminal device. Therefore, when a failure, such as a communication error, is generated, an audio frequency signal of a communication protocol of facsimile communication can be transmitted to the center device and used for analyzing the failure.

According to the second aspect of the present invention, at the predetermined time stored in the recording management table, the audio frequency signal is converted into a digital audio signal and the converted digital audio signal is transmitted. Therefore, a timer can be set such that a recording of data can be executed periodically for collecting the abnormal sound that is generated non-periodically. As a result, an automatic collection of the abnormal sound data is facilitated.

According to the third aspect of the present invention, the digital audio signal is transmitted to the center device by using the VoIP or the streaming in the real-time communication mode. An audio file of the digital audio signal may be transmitted to the center device. Thus, by using an appropriate audio data collecting method according to a purpose of the maintenance, the collection and the transmission of the data can be performed at a higher speed.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 illustrates an example of a recording management table of the digital MFP.

FIG. 5 is a flowchart illustrating a sound recording process executed by the digital MFP.

DETAILED DESCRIPTION OF PREFERRED EMBODIMENTS

A description will be made of preferred embodiments of the present invention with reference to the drawings. Further, in the preferred embodiments described hereinafter, like numerals are assigned to like constituent elements.

Figure 1:
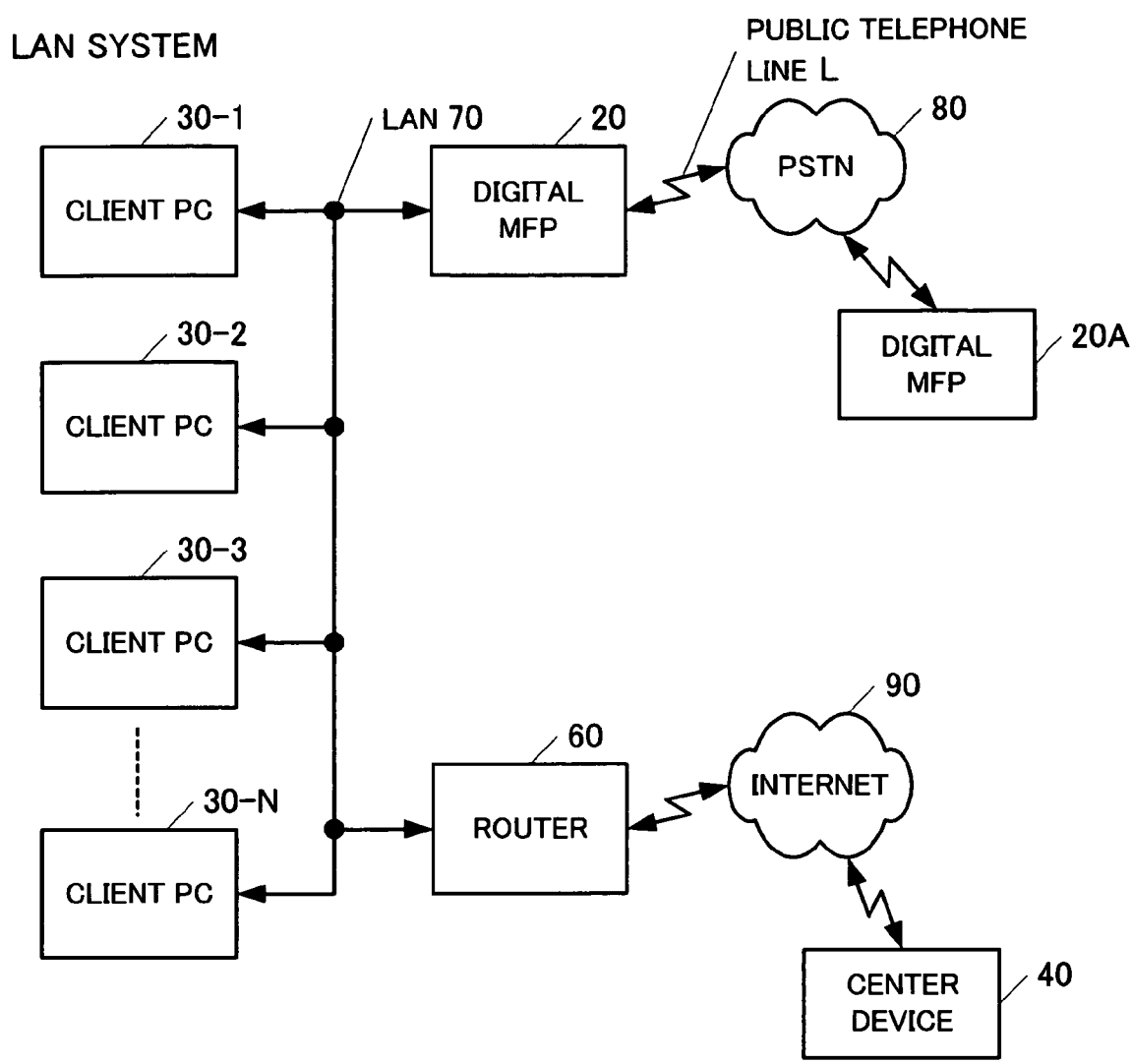
FIG. 1 is a block diagram illustrating a configuration of a Local Area Network (LAN) including a digital MFP and a remote maintenance system in which the digital MFP is connected to a center device via the Internet according to a preferred embodiment of the present invention.

FIG. 1 illustrates a configuration of a LAN including a digital MFP 20 and a remote maintenance system in which the digital MFP 20 is connected to a center device 40 via the Internet 90. Further, the digital MFP 20 is a facsimile machine with a copying function, a printing function and a scanning function.

In the LAN according to the present preferred embodiment, N client Personal Computers (PCs) 30-1 through 30-N (hereinafter collectively referred to as a "client PC 30"), the digital MFP 20 and a router 60 are connected via a LAN 70. Further, the digital MFP 20 is connected to a Public Switched Telephone Network (PSTN) 80 via a public telephone line L. The router 60 is connected to the Internet 90. Each client PC 30 establishes a connection with the Internet 90 via the router 60 or a mail server (not illustrated). Accordingly, each client PC 30 can browse a webpage or transmit and receive electronic mail. By accessing the digital MFP 20, each client PC 30 can use each of a copying function, a printing function, a scanning function and a facsimile function of the digital MFP 20.

For example, the digital MFP 20 carries out facsimile communication with another digital MFP 20A via the PSTN 80. The digital MFP 20 is connected to the center device 40 via the LAN 70, the router 60, and the Internet 90, which is an IP network. When a sound recording instruction key 5a of an operation unit 5 is operated, a main control unit 1 of the digital MFP 20 picks up a sound, such as an abnormal sound that is generated in the digital MFP 20, by using a microphone 14A. Alternatively, in the digital MFP 20, a voice or an audio frequency signal of a facsimile signal transmitted via the PSTN 80 or the Internet 90 is converted into a digital audio signal by an audio file generating unit 14. Then, the converted digital audio signal is transmitted via the Internet 90 to the center device 40.

The digital MFP 20 includes a Random Access Memory (RAM) 7 storing a recording management table 7a. The recording management table 7a stores a type of recording and a recording time with regard to a transmission of a digital audio signal. At a predetermined time stored in the recording management table 7a, the main control unit 1 of the digital MFP 20 converts a sound, such as the abnormal sound, or an audio frequency signal, such as a communication voice or a facsimile signal, into a digital audio signal. Then, the main control unit 1 transmits the converted digital audio signal. In the transmission process, the digital audio signal is transmitted to the center device 4 by using the VoIP or the streaming in a real-time communication mode. Alternatively, the digital MFP 20 transmits an audio file of the digital audio signal to the center device 40.

The client PC 30 of FIG. 1 is a terminal device, for example, a known PC. The client PC 30 executes a process of generating, recording and storing of image data or character data. In the present preferred embodiment, as one example, the client PC 30 is a terminal device which receives image data scanned by a scanner. Alternatively, the client PC 30 is an information processing device which carries out facsimile transmission of image data of an original document image generated by the client PC 30 (for example, image data of an original document created by software of a word processor) to a destination facsimile machine or a destination digital MFP, etc. via the digital MFP 20.

Figure 2:
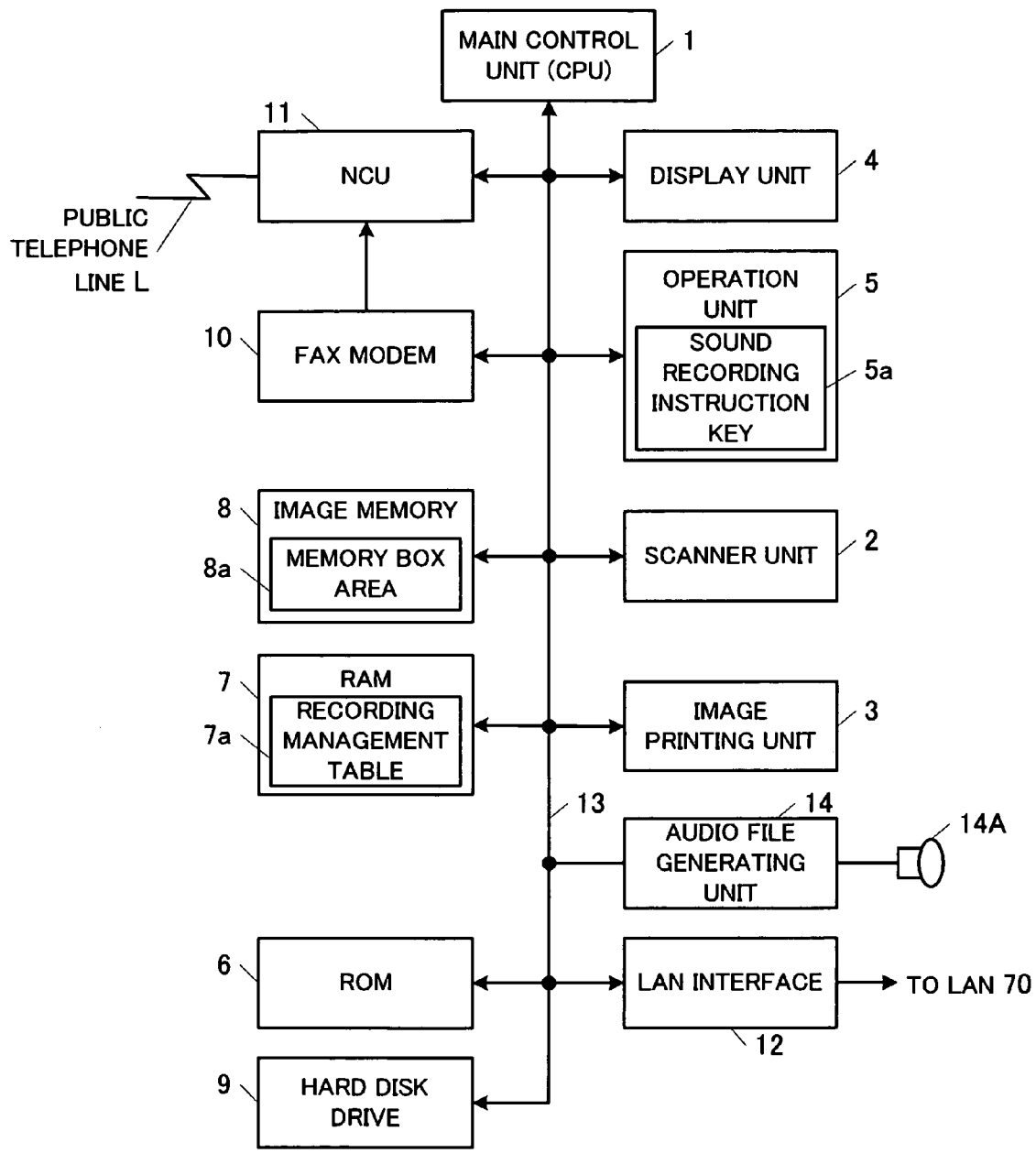
FIG. 2 is a block diagram illustrating a configuration of the digital MFP.

In FIG. 2, the digital MFP 20 includes a copying function, a printing function and a scanning function in addition to a conventional Group 3 (G3) facsimile communication function. The main control unit 1 is specifically a Central Processing Unit (CPU). The main control unit 1 is connected to each of following hardware components via a bus 13 and controls each of the hardware components. In addition, the main control unit 1 executes various software functions described hereinafter. A scanner unit 2 scans an original document by a line sensor using Charge-Coupled Devices (CCD) or the like. The scanner unit 2 outputs bi-level image data converted in a binary of black and white. An image printing unit 3 is an electro-photographic printer device, for example. The image printing unit 3 prints out as a hardcopy, image data scanned and converted by the scanner unit 2 and image data received from another facsimile machine in facsimile communication. The image printing unit 3 also prints out character data.

A display unit 4 is a display device such as a Liquid Crystal Display (LCD) or a Cathode Ray Tube (CRT) display. The display unit 4 displays an operation status of the digital MFP 20. The display unit 4 also displays image data of a transmission original document and received image data. The operation unit 5 includes character keys, a ten-key numeric pad for dialing, speed dial keys, one-touch dial keys and various function keys necessary for operating the digital MFP 20. The operation unit 5 includes the sound recording instruction key 5a for instructing an execution of a sound recording process, as illustrated in FIG. 5. Further, by forming the display unit 4 as a touch screen, a part or all of various keys of the operation unit 5 may be substituted.

A Read Only Memory (ROM) 6 previously stores various software programs necessary for an operation of the digital MFP 20 and executed by the main control unit 1. In the present preferred embodiment, the ROM 6 stores at least a program of the sound recording process, as illustrated in FIG. 5. The RAM 7 includes a Static RAM (SRAM), a Dynamic RAM (DRAM), a Synchronous DRAM (SDRAM) or the like. The RAM 7 is used as a working area of the main control unit 1 and stores temporary data that is generated at an execution of a program. The RAM 7 stores the recording management table 7a. Further, when a flash memory is used as the RAM 7, contents of stored data are not lost even when power is shut down due to, for example, a power failure or a moving of the digital MFP 20.

FIG. 4 illustrates an example of the recording management table 7a stored in the RAM 7 of FIG. 2. As illustrated in FIG.

4, the recording management table 7a includes a mode for recording an audio frequency signal of the facsimile communication, and a mode for recording a sound, particularly, an abnormal sound, in the digital MFP 20 by the microphone 14A. Further, the microphone 14A is arranged in the digital MFP 20. Under the abovementioned modes, recording can be performed at a designated recording time. Further, recording or transferring is not limited to a sound or a human voice. For example, a signal tone or a facsimile communication signal of a modem may be recorded or transferred.

An image memory 8 is a DRAM or the like. The image memory 8 stores transmission image data, received image data or scanned image data. The image memory 8 includes a memory box area 8a sectioned into a plurality of memory boxes according to a number of a plurality of client PCs 30 or users of the client PCs 30. Each client PC 30 temporarily stores in a corresponding memory box, image data transmitted or received by the facsimile function, image data scanned by the scanning function or the copying function, or image data transferred from the client PC 30 when using the printing function. When reading from the memory box, the client PC 30 transmits a transfer instruction request signal to the digital MFP 20 to read image data from the corresponding memory box and to transfer the image data. A hard disk drive 9 is a storage device including a magnetic disk and stores various data and programs.

A facsimile Modulator-Demodulator (FAX MODEM) 10 is connected to the public telephone line L. The FAX MODEM 10 includes functions of a FAX MODEM for general facsimile communication. A Network Control Unit (NCU) 11 carries out an operation for making and braking a direct current loop or the like of the analog public telephone line L. The NCU 11 is a hardware including an automatic dial function and connects the FAX MODEM 10 to the public telephone line L according to necessity. Further, the NCU 11 may be connected to a digital communication line (for example, an Integrated Services Digital Network (ISDN) line) of a baseband transmission system via a prescribed terminal adaptor and a Digital Service Unit (DSU).

A LAN interface 12 is connected to the LAN 70 and receives a signal and data from the LAN 70. Meanwhile, the LAN interface 12 executes an interface process relating to LAN communication, such as a signal conversion and a protocol conversion, by transmitting a signal and data to the LAN 70. In the present preferred embodiment, the digital MFP 20 is connected from the LAN interface 12 via the LAN 70, the router 60 and the Internet 90 to the center device 40. The digital MFP 20 receives various signals for a remote control from the center device 40 via the Internet 90. The audio file generating unit 14 converts a sound (in particular, an abnormal sound) in the digital MFP 20 recorded by the microphone 14A, or a voice or an audio frequency signal of a facsimile signal transmitted by the FAX MODEM 10 into a digital audio signal. The audio file generating unit 14 temporarily stores the digital audio signal in the RAM 7. Then, the audio file generating unit 14 transmits the digital audio signal via the Internet 90 to the center device 40 by using the LAN interface 12.

According to the facsimile communication function of the digital MFP 20 described above, the bi-level image data transferred from each of the client PCs 30-1 through 30-N or the bi-level image data scanned by the scanner unit 2 is encoded by software in accordance with an encoding scheme, such as the Modified Huffman (MH), the Modified Relative element address designate (MR) and the Modified MR (MMR) defined in the International Telecommunication Union Telecommunications (ITU-T) recommendation T. 4. Then, the image data is transmitted to a destination facsimile machine, for example, the digital MFP 20A. On the contrary, the encoded data received from the digital MFP 20A, which is the destination facsimile machine, is stored in the image memory 8. Then, the data is read from the image memory 8 and decoded. The decoded data is printed out from the image printing unit 3 according to necessity.

Figure 3:
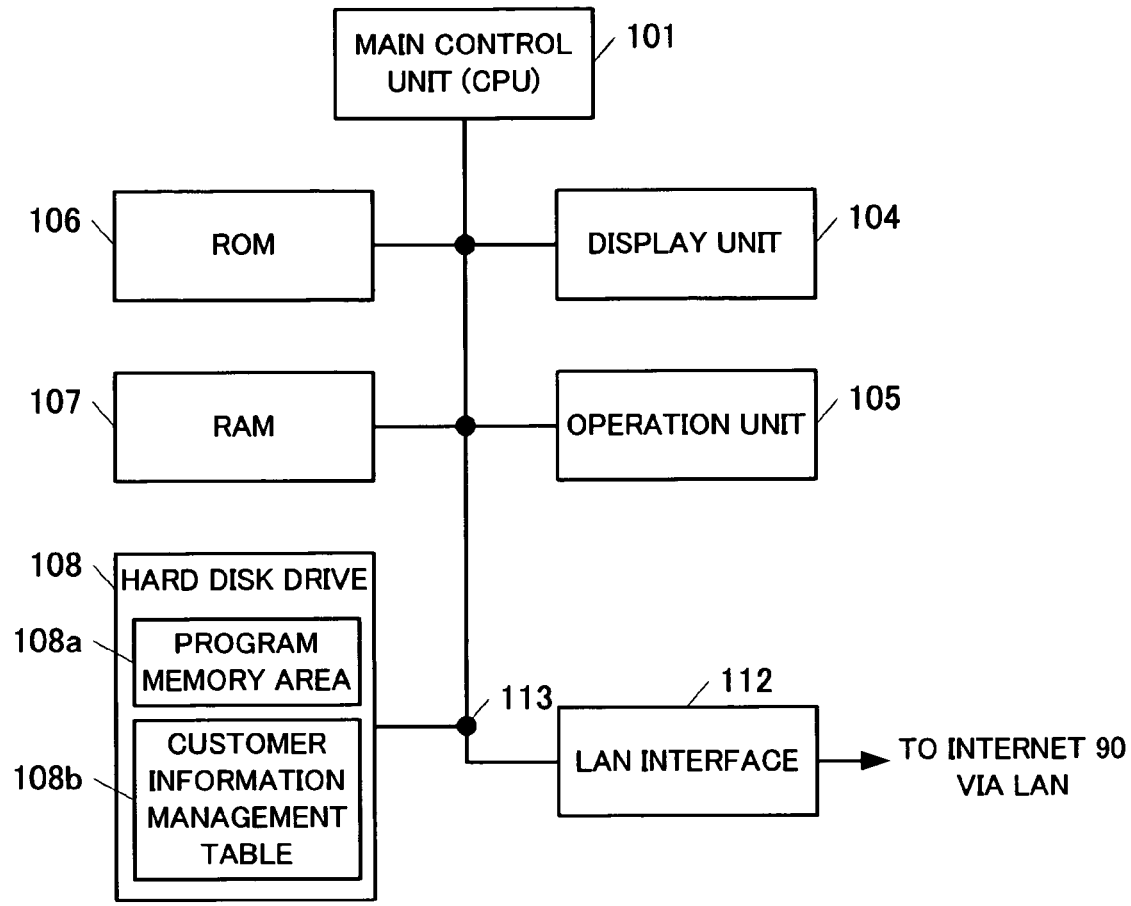
FIG. 3 is a block diagram illustrating a configuration of the center device.

FIG. 3 is a block diagram illustrating a configuration of the center device 40 of FIG. 1. The center device 40 is, for example, a PC.

In FIG. 3, a main control unit 101 is specifically a CPU. The main control unit 101 is connected to each of following hardware components via a bus 113 and controls each of the hardware components. In addition, the main control unit 101 executes various software functions to be described later. In the center device 40, a scanner unit and an image printing unit (not illustrated) are optional. A display unit 104 is a display device such as a LCD or a CRT display. The display unit 104 displays an operation state of the center device 40. The display unit 104 also displays image data of a transmission original document and received image data. For example, an operation unit 105 is a keyboard and used for entering character data and an instruction command.

A ROM 106 previously stores various software programs necessary for an operation of the center device 40 and executed by the main control unit 101. The RAM 107 includes an SRAM, a DRAM, a SDRAM or the like. The RAM 107 is used as a working area of the main control unit 101 and stores temporary data that is generated at an execution of a program. A hard disk drive 108 is a storage device including a magnetic disk. For example, the hard disk drive 108 includes a program memory area 108a and a customer information management table 108b. The program memory area 108a stores a software program or the like for a remote control of the digital MFP 20 executed by the main control unit 101. The customer information management table 108b stores a customer name, a customer management number, address information, such as a global IP address, for each customer who is a user of the digital MFP 20. A LAN interface 112 is connected to the router 60 of FIG. 1 via a LAN (not illustrated) and the Internet 90.

FIG. 5 is a flowchart illustrating a sound recording process executed by the main control unit 1 of the digital MFP 20 of FIG. 1.

In FIG. 5, a determination is carried out at step S1 as to whether or not the sound recording instruction key 5a has been pressed. Until a determination of YES is made at step S1, the process of step S1 is repeated. When a determination of YES is made at step S1, a determination is carried out at step S2 as to whether or not a real-time communication mode is set. When a determination of YES is made at step S2, the process proceeds onto step S3. When a determination of NO is made at step S2, the process proceeds onto step S7. Next, at step S3, a center calling signal including device information of the digital MFP 20 is transmitted to the center device 40 via the Internet 90. For example, the device information is a serial number and model information.

At step S4, a voice communication session is established with the center device 40 via the Internet 90 by a call control. At step S5, a voice communication is carried out with an operator of the center device 40, and a communication voice is converted into a digital audio signal and temporarily stored in the RAM 7. Then, the digital audio signal is transmitted to the center device 40 by the VoIP (ITU-T recommendation H. 323). When the voice communication ends, a voice communication session is opened at step S6. Then, the sound recording process ends. In place of the VoIP, streaming may be used.

In case of the streaming, a scheme such as the Real Audio (registered trademark) and the Advanced Streaming Format (ASF) may be applied.

Meanwhile, at step S7, by using the microphone 14A and the audio file generating unit 14, an abnormal sound is recorded and converted into a digital audio signal and temporarily stored in the RAM 7 as an audio file. Then, at step S8, the audio file is transferred via the Internet 90 to the center device 40 under the File Transfer Protocol (FTP) or the like. Then, the sound recording process ends. Further, as the audio file, the Wave (WAV), the MPEG Audio Layer-3 (MP3), the Windows Media Audio (WMA) or the like may be used.

Further, the sound recording process illustrated in FIG. 5 is executed when the sound recording instruction key 5a is pressed. As another example, at a predetermined time based on the stored contents of the recording management table 7a of FIG. 4, the recording process of the facsimile communication of steps S4 through S6 or the recording process by the microphone 14A of steps S7 and S8 may be executed under a registered recording mode.

As described above, according to the digital MFP 20 of the present preferred embodiment, the main control unit 1 of the digital MFP 20 picks up a sound, such as an abnormal sound that is generated in the digital MFP 20, by using the microphone 14A in accordance with the pressing of the sound recording instruction key 5a of the operation unit 5. Alternatively, in the digital MFP 20, the voice or the audio frequency signal of the facsimile signal transmitted via the PSTN 80 or the Internet 90 is converted into a digital audio signal by the audio file generating unit 14. Then, the converted digital audio signal is transmitted from the digital MFP 20 via the Internet 90 to the center device 40. Therefore, the sound, such as the abnormal sound that is generated in the digital MFP 20 or the audio frequency signal of the voice communication or the like transmitted in the digital MFP 20, can be listed at the center device 40. This can be helpful in investigating a cause of the failure in the digital MFP 20. In particular, for preventing a leakage, only a manager or a specific user is permitted to record. That is, by a remote diagnostic function using an always-connected IP network, the digital MFP 20 itself can collect the abnormal sound that is generated due to the failure in the digital MFP 20 and transmit the digital audio signal converted from the collected abnormal sound to the center device 40. Furthermore, the digital MFP 20 can transmit the audio frequency signal transmitted in the digital MFP 20. Therefore, when a failure such as a communication error is generated, an audio frequency signal of a communication protocol of facsimile communication can be transmitted to the center device 40 to be used for analyzing the failure.

The digital MFP 20 includes the RAM 7 storing the recording management table 7a. The recording management table 7a stores a type of recording and a recording time with regard to the transmission of the digital audio signal. At the predetermined time stored in the recording management table 7a, the main control unit 1 of the digital MFP 20 converts the sound, such as the abnormal sound or the audio frequency signal such as the communication voice or the facsimile signal, into a digital audio signal. Then, the mail control unit 1 transmits the converted digital audio signal. Therefore, a timer can be set such that a recording of sound can be executed periodically for collecting the abnormal sound that is generated non-periodically. As a result, the abnormal sound data can be collected automatically.

In the above-described transmission process, a digital audio signal is transmitted to the center device 40 by using the VoIP or the streaming in the real-time communication mode. Alternatively, an audio file of the digital audio signal is transmitted to the center device 40. Therefore, by using an appropriate audio data collecting method according to a purpose of the maintenance, the collection and the transmission of the data can be performed at a higher speed.

The above-described preferred embodiment relates to an example of the digital MFP 20. However, the present invention is not limited to such a particular example. For example, the present invention can be broadly applied to a facsimile function or a facsimile server device including a facsimile function.

While the description above refers to particular embodiments of the present invention, it will be understood that many modifications may be made without departing from the scope thereof. The accompanying claims are intended to cover such modifications as would fall within the true scope and spirit of the present invention.

The discussion above refers to particular embodiments that are therefore to be considered in all respects as illustrative and not restrictive, the scope of the invention being indicated by the appended claims, rather than the foregoing description, and all changes with come within the meaning and range of equivalency of the claims are therefore intended to be embraced therein.

What is claimed is:

1. A communication terminal device connected to a center device via an Internet Protocol (IP) network, the communication terminal device comprising:

a microphone periodically picking up a sound automatically that is generated by the communication terminal device independent of communication with the center device;

means for periodically picking up a non-audible audio frequency signal selected from the group consisting of a signal tone, a voice communication signal and a facsimile communication signal of a modem transmitted in the communication terminal device to a receiving device in accordance with a predetermined operation independent of communication with the center device;

means for converting the picked up audio frequency signal into a digital audio signal;

means for transmitting the converted digital audio signal to the center device via the IP network;

means for storing a recording management table storing a pre-determined transmission time; and means for determining whether or not the transmission time stored in the recording management table has arrived, wherein when the transmission time stored in the recording management table has arrived, the audio frequency signal is converted into the digital audio signal and transmitted to the center device.

2. The communication terminal device according to claim 1, further comprising means for executing streaming for transmitting the digital audio signal.

3. The communication terminal device according to claim 1, further comprising means for executing a Voice over Internet Protocol for transmitting the digital audio signal.

4. The communication terminal device according to claim 1, further comprising:

means for converting the digital audio signal into an audio file; and means for executing a File Transfer Protocol for transmitting the audio file.

5. The communication terminal device according to claim 1, further comprising means for transmitting information that specifies the communication terminal device.

6. A communication terminal device connected to a center device via an Internet Protocol (IP) network, the communication terminal device comprising:
- a microphone which periodically and automatically picks up a sound that is generated by the communication terminal device independent of communication with the center device;
- a conversion unit which converts a non-audible audio frequency signal selected from the group consisting of a signal tone, a voice communication signal and a facsimile communication signal of a modem transmitted in the communication terminal device to a receiving device and an audio frequency signal output from the microphone into a digital audio signal;
- a transmission unit which transmits the converted digital audio signal to the center device via the IP network; and
- a memory which stores a recording management table storing a pre-determined transmission time,
- wherein when the transmission time stored in the recording management table has arrived, the conversion unit converts the audio frequency signal into the digital audio signal and the transmission unit transmits the converted digital audio signal to the center device.

7. The communication terminal device according to claim 6, further comprising an operation unit,
- wherein when the operation unit is operated, the conversion unit converts the audio frequency signal into the digital audio signal and the transmission unit transmits the converted audio frequency signal to the center device.

8. The communication terminal device according to claim 6, wherein the transmission unit transmits the digital audio signal by streaming.

9. The communication terminal device according to claim 6, wherein the transmission unit transmits the digital audio signal by a Voice over Internet Protocol.

10. The communication terminal device according to claim 6, further comprising an audio file generating unit which generates an audio file from the digital audio signal.

11. The communication terminal device according to claim 10, wherein the transmission unit transmits the audio file by a File Transfer Protocol.

12. A remote diagnostic method of a communication terminal device connected to a center device via an Internet Protocol (IP) network, the remote diagnostic method comprising the steps of:
- converting a sound i picked up by a microphone and generated by the communication terminal device periodically and automatically into an audio frequency signal independent of communication with the center device;
- converting the converted audio frequency signal and a non-audible audio frequency signal selected from the group consisting of a signal tone, a voice communication signal and a facsimile communication signal of a modem transmitted in the communication terminal device to a receiving device into a digital audio signal;
- transmitting the digital audio signal to the center device via the IP network;
- determining whether or not a predetermined time stored in a recording management table has arrived; and
- starting a conversion of the audio frequency signal into a digital audio signal when the predetermined time has arrived.

13. The remote diagnostic method of the communication terminal device according to claim 12, further comprising the steps of:
- performing a predetermined operation from an operation unit; and
- starting a conversion of the audio frequency signal into the digital audio signal when the predetermined operation is performed.

14. The remote diagnostic method of the communication terminal device according to claim 12, further comprising the step of transmitting the digital audio signal by streaming.

15. The remote diagnostic method of the communication terminal device according to claim 12, further comprising the step of transmitting the digital audio signal by a Voice over Internet Protocol.

16. The remote diagnostic method of the communication terminal device according to claim 12, further comprising the step of converting the digital audio signal into an audio file.

17. The remote diagnostic method of the communication terminal device according to claim 16, further comprising the step of transmitting the audio file by a File Transfer Protocol.

18. The communication terminal device according to claim 4, wherein the audio file comprises a WAVE (WAV), MPEG Audio Layer-3 (MP3) or Windows Media Audio (WMA) file format.

19. The communication terminal device according to claim 10, wherein the audio file comprises a WAVE (WANT), MPEG Audio Layer-3 (MP3) or Windows Media Audio (WMA) file format.

20. The remote diagnostic method of the communication terminal device according to claim 16, wherein the audio file comprises a WAVE (WAV), MPEG Audio Layer-3 (MP3) or Windows Media Audio (WMA) file format.

21. The communication terminal device according to claim 1, wherein the digital audio signal is transmitted in non-real-time.

* * * * *